Feb. 28, 1956     H. T. CRIPPS     2,736,242
APPARATUS FOR CUTTING DRUM CAMS
Filed Aug. 23, 1950     2 Sheets-Sheet 1
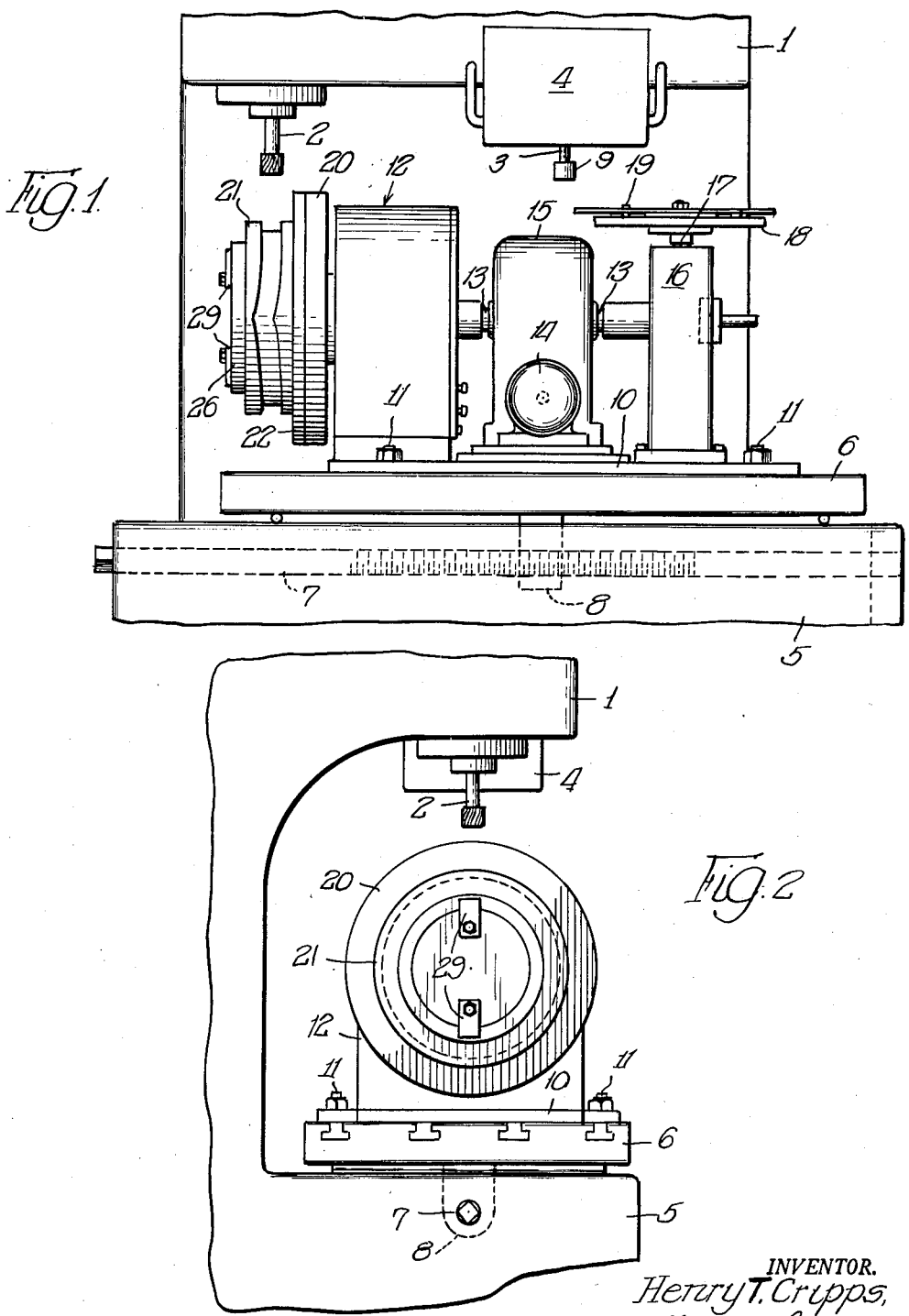
INVENTOR.
Henry T. Cripps,
BY George L. Haight &
George H. Simmons
Atty.

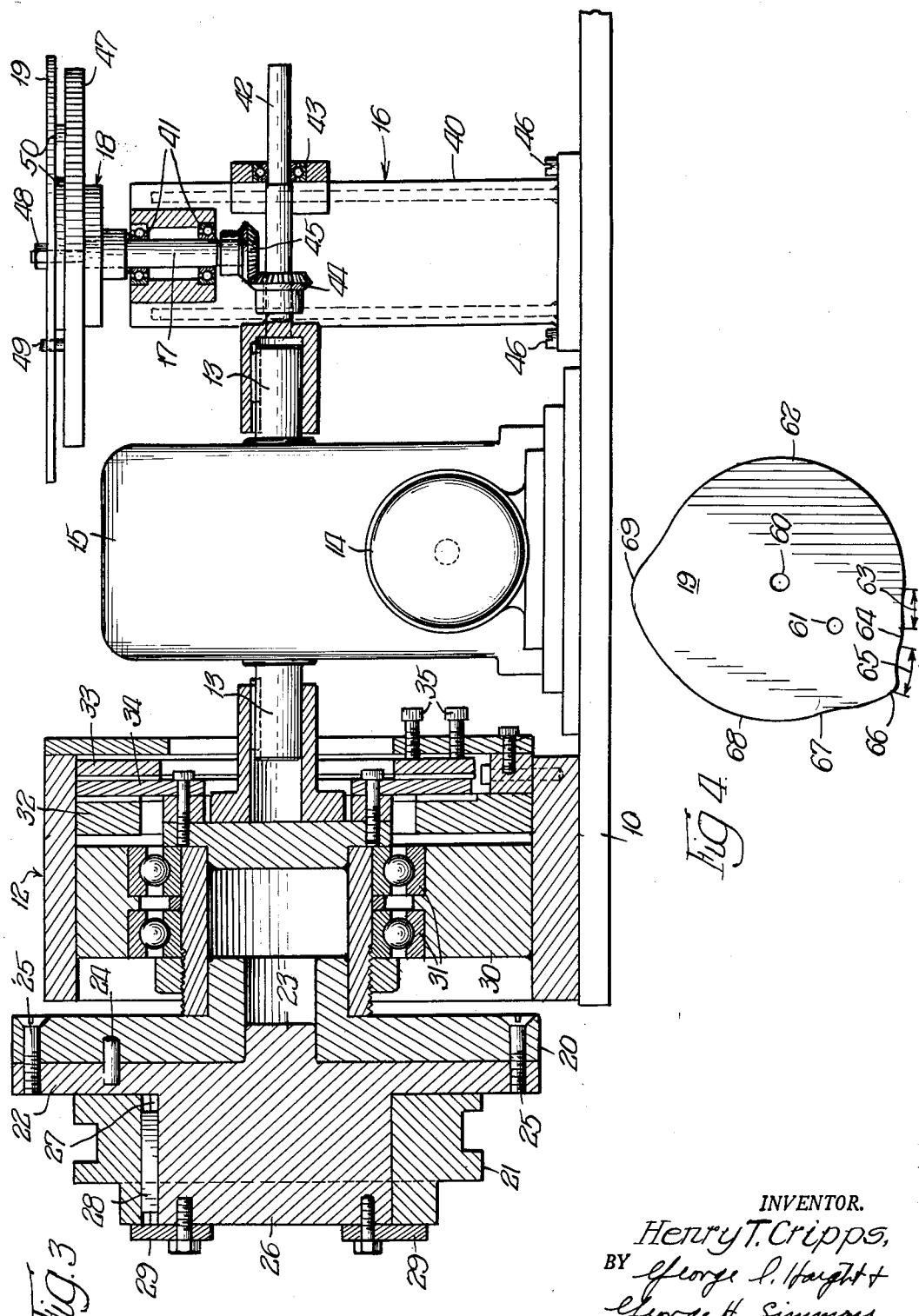

United States Patent Office 2,736,242
Patented Feb. 28, 1956

2,736,242

APPARATUS FOR CUTTING DRUM CAMS

Henry T. Cripps, Chicago, Ill.

Application August 23, 1950, Serial No. 181,049

2 Claims. (Cl. 90—13.9)

This invention relates to a method of and apparatus for adapting a duplicating machine to cut drum cams from a disc-like pattern, and has for its principal object a provision for a new and improved method and apparatus of this kind.

It is a main object of the invention to provide a method of cutting drum cams by translating variations in the radius of a disc-like pattern into the axial variation of a drum cam.

A further object of the invention is to provide a method of cutting drum cams by simultaneously rotating a cam blank and a disc-like pattern around axes intersecting at right angles, thereby to translate variations in radius of the pattern into axial movements of the blank while the blank is engaged by a cutter which forms the cam path therein.

A further object of the invention is to provide a method of cutting a drum cam from a disc-like pattern on a duplicating machine, in which the cutter and tracer are disposed on parallel fixed axes and in which a cam blank is journaled on the work table of the machine and the work table is power driven axially of the blank under the control of the tracer as the tracer is moved by the pattern during simultaneous rotation of the pattern and blank.

Another object of the invention is to provide an apparatus for attachment to a duplicating machine work table to mount thereon a cam blank and cam pattern which are rotatable about intersecting axes, both of which lie in a plane through the axis of rotation of the cutter of the machine and the axis of the tracer thereof.

Another object of the invention is to provide an apparatus for journaling a cam blank and pattern on the work table of a duplicating machine for rotation around intersecting axes, one of which is at right angles to the axis of rotation of the cutter of the machine and the other is parallel to the axis of the tracer of the machine, and for rotating said blank and pattern in unison.

Another object of the invention is to provide an apparatus for journaling a cam blank and pattern on the work table of a duplicating machine for rotation around intersecting axes that are disposed in a plane through the axis of the cutter and tracer of the machine, and for rotating the blank and pattern in unison with the pattern engaging the tracer at a point in said plane thereby to control the table to move longitudinally of the axis of the blank.

Another object of the invention is to provide an apparatus for adapting a duplicating machine for cutting of drum cams from a disc-like pattern, which apparatus can be manufactured and maintained at low cost without sacrificing durability of the apparatus and accuracy of the work produced on it.

Further objects of the invention, not specifically mentioned here, will be apparent from the detailed description and claims which follow, reference being had to the accompanying drawings in which a preferred embodiment of the invention is shown by way of example and in which:

Fig. 1 is a fragmentary elevational view diagrammatically illustrating the invention;

Fig. 2 is an end view of Fig. 1;

Fig. 3 is a view along the axis of rotation of the blank, partly in cross section, and illustrating the invention; and Fig. 4 is a plan view of a typical disc-like cam pattern.

Drum type cams in which the cam path variations are parallel to the axis of rotation of the cam are commonly employed in many machines. Heretofore, insofar as applicant is aware, such cams have been cut from a straight-line pattern in a machine in which the pattern serves as a cam to move the cutter as required to duplicate the pattern in a cam blank. Since the pattern furnishes the power to move the blank against the cutter, the pattern must necessarily be ruggedly built and is usually hardened, with the result that the pattern is of itself unduly expensive.

There are available on the open market, and in common usage in machine shops, duplicating machines wherein a cutter and a tracer are mounted upon a head that is movable at right angles to a plane through the axis of the cutter and tracer. Such machines are also equipped with a work table that is power driven under the control of the tracer in a direction parallel with the plane through the axis of the cutter and tracer that is at right angles to the axis of rotation of the cutter. Heretofore, in order to cut drum cams on a duplicating machine of this type, it has been necessary to provide a cam pattern which is of itself drum type. Such patterns, usually composed of wood, are expensive to build and, because it is composed of wood, tolerances in the pattern are necessarily quite large.

The present invention provides a method of adapting such a duplicating machine to the cutting of drum type cams from a pattern in which the variations in the cam path appear as radial variations in the disc-like pattern. Since the tracer of such duplicating machines merely controls the application of power to move the cutter head and/or work table of the machine, the pattern can be composed of an easily worked material, such as mild steel, brass, zinc, and the like. Since it is possible to work to closer limits in metal than in wood, the cam pattern can be made with great accuracy and the drum cam cut from such pattern can be held to closer tolerance than has been possible heretofore.

In carrying out the method of the present invention, the cutter head of the duplicating machine is locked and the work table unlocked, so that movement within the machine is confined to one direction. A blank is mounted on the work table for rotation around an axis at right angles to the axis of rotation of the cutter and disposed in a plane through the axis of the cutter and the axis of the tracer. Also mounted upon the work table is a pattern shaft that is journaled for rotation about an axis lying in said plane and at right angles to the axis of rotation of the blank and parallel to the axes of the cutter and tracer. Carried upon the pattern shaft and rotated thereby is a disc-like pattern, the contour of which defines the cam path that it is desired to cut as radial variations from the axis of rotation of the pattern. Also mounted upon the work table is a source of power that is connected through suitable gearing to rotate the blank and pattern simultaneously. With the tracer registered with the pattern and the cutter with the blank, such rotations control movement of the work table longitudinally of the axis of rotation of the blank as determined by the radial variations of the rotating pattern, thereby to duplicate in the blank the cam path of the pattern.

Referring now to the drawings in more detail, particularly Figs. 1 and 2, it will be seen that the duplicating machine cutter head 1 carries a cutter 2 and a tracer 3, the axes of which are parallel and disposed in a common plane. The tracer connects with a control unit 4 by which movement of the cutter head 1 and work table of the machine are controlled. In certain machines now readily available, this control is hydraulic and in other machines electric. The method and apparatus of the present invention will work with either type of machine.

Mounted upon the bed 5 of the machine is a work table 6 which is rectangular in shape and adapted for movement longitudinally of itself, as indicated by the lead screw 7 which is threaded through a collar 8 on the table.

Mounted upon the work table 6 of the machine is the apparatus of the present invention, shown to consist of a base 10 fixed to the table in any preferred manner, such as by bolts 11. Mounted upon this base is a journal 12 which supports a shaft 13 for rotation around an axis extending longitudinally of the table and at right angles to the axis of rotation of the cutter. Also mounted upon the bed 10 is a source of power 14 that is connected through a reduction gearing 15 to the shaft 13 to rotate that shaft. Also mounted upon the bed 10 is a journal 16 that supports a shaft 17 for rotation around an axis at right angles to the axis of rotation of the shaft 13. Mounted upon the shaft 17 is a plate 18 to which a pattern 19 is fixed, as will presently appear.

Fixed upon the shaft 13 is a work-supporting device 20 which carries a drum cam blank 21.

In setting up the machine for operation, the cutter head 1, being movable at right angles to the plane through the axes of the cutter 2 and tracer 3, is moved until that plane coincides with the axes of the shafts 13 and 17, after which the cutter head 1 is locked against further movement. The head also being movable longitudinally of the axis of the cutter is moved in that direction to bring the tracer wheel 9 into engagement with the pattern 19, and the cutter 2 into engagement with the blank 21. The source of power 14 is then operated to rotate shafts 13 and 17 in unison, the variations in the radius of the cam pattern 19 operating the tracer shaft 3 to control the movement of the work table longitudinally of the axis of rotation of the blank 21. The path defined in the pattern is thus transferred to the blank to form the cam.

As will be seen, particularly in Fig. 3, the work supporting device 20 consists of a face plate to which the blank 21 is fixed. The devices for fixing the blank on the face plate will vary to suit the requirements of the particular cam being cut. As shown, these devices consist of an arbor plate 22 having a locating boss 23 that registers in a bore in the face plate 20 to position the arbor coaxially of the shaft 13. The arbor is located with respect to the face plate by suitable means such as a dowel 24 and fixed thereon by suitable means such as screws 25.

The arbor has a cylindrical hub section 26 over which the blank fits, which section is provided with a keyway 27 and a key 28 therein locates the blank with respect to the arbor. The blank is held on the arbor by clamps 29.

The journal 12 consists of a stationary support 30 which is attached to the base plate 10 in any preferred manner. Mounted in this support are low friction bearings, shown as ball bearings 31, which support the shaft 13 in the journal. Fixed upon the stationary portion of the journal is a stationary brake plate 32 and a movable brake plate 33, between which is disposed a brake disc 34 that is fixed upon the shaft 13 and rotated therewith. Adjusting screws 35 are employed to regulate the tension of the movable shoe 33 upon the disc 34, thereby supplying sufficient braking action to the movement of the shaft 13 to prevent chattering of that shaft occasioned by the engagement of the cutter with the work.

Also mounted upon the base 10 is the motor 14 and reduction gearing 15 through which the shaft 13 is driven. Since the rotation of the shaft 13 feeds the work into the cutter, rotation of the shaft 13 will be relatively slow and the reduction gearing 15 must be capable of reducing the relatively high speed of the source of power 14 to the desired low value. In one instance, the reduction gearing 15 has a ratio of 80 to 1. The particular type of reduction gears 15 and source of power 14 employed is not of the essence of the present invention, since there are available upon the open market a number of devices suitable for use herein.

The journal 16, by which the pattern shaft 17 is mounted upon the base 10, consists of a post-like upright member 40, in the upper part of which the shaft 17 is journaled in suitable bearings such as ball bearings 41. A shaft 42, supported and splined or keyed at one end to the extension of shaft 13, is supported in the member 40 by suitable bearings, such as ball bearing 43. Splined upon the shaft 42 is a bevel gear 44 which meshes with a companion gear 45 keyed upon the shaft 17. The journal 16 is mounted upon the base 10 for limited movement with respect thereto, as indicated by the screws 46, bevel gear 44 sliding along on the shaft during such movement. This arrangement permits accommodating patterns of various overall radii upon the machine.

Mounted upon the free end of the shaft 17 is a face plate 47 upon which the pattern 19 is supported and secured by suitable means such as a bolt 48. Face plate 47 preferably carries a dowel 49 which projects through a hole in the pattern to fix the pattern with respect to the plate and shaft. If desired, and where the diameter of the pattern is less than the diameter of the plate 47, suitable spacers 50 may be employed to elevate the pattern so that the tracing wheel 9 of the machine can follow the contour of the pattern without interference from the face plate.

As will be seen in Figs. 1, 3 and 4, the pattern 19 is a relatively thin, disc-like, metallic pattern containing a central perforation 60 through which the bolt 48 projects to secure the pattern to the plate 47. The pattern also contains a perforation 61 which registers with the dowel 49 to position the pattern on the plate. The outer edge of the pattern contains a long dwell 62 which merges into a zone 63 of increasing radius, adjacent one end of which is a dwell 64 which in turn connects with another zone of increasing radius 65 leading to a dwell 66 of maximum radius. The radius of the pattern decreases between 66 and a point 67 to a dwell 68 which may be of the same radius as the dwell 62 but is shown as of slightly greater radius. A second rise and fall, indicated generally at 69, completes the contour of the cam.

Since tracers of machines of the type with which the instant invention are intended to be used merely control the application of power to move the work table of the machine, pattern 19 can be composed of a relatively soft, readily workable metal, and the pattern can be formed in great accuracy at relatively low cost. When properly set up in the duplicating machine, the pattern can be transferred to the cam blank with great accuracy and as a result drum cams can be made quickly and at relatively low cost, such cams being accurate within very close tolerances.

While I have illustrated my invention by showing and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What is claimed is:

1. Apparatus for forming a drum cam on a duplicating machine having a cutter rotatable around a fixed axis and movable longitudinally of said axis into registration with the work, and a tracer normally having its axis parallel to the axis of the cutter, which tracer is mounted for movement in a plane through said axes, which machine has a work table movable in said plane by power controlled by said tracer, comprising: a disklike pattern having the cam path defined as radial variations; means for mounting said pattern on said work table for rotation around an axis disposed in said plane parallel to the axes of the cutter and tracer in its normal position; a shaft journaled upon the work table for rotation around an axis in said plane disposed at right angles to said axes; a face plate fixed upon said shaft; an arbor carried by said face plate to which a drum cam blank is attached; a key engaging the arbor and blank for specifically locating the blank around the axis of the shaft; and means for simultaneously rotating said cam blank and pattern at the same speed to cause the pattern to move the tracer and thereby apply power to move the work table to feed the cutter into the work thereby to cause it to translate the radial variations of the pattern path into axial variations of the path in the cam blank.

2. Apparatus for forming a drum cam on a duplicating machine having a cutter rotatable around a fixed axis and movable longitudinally of said axis into registration with the work, and a tracer normally having its axis parallel to the axis of the cutter, which tracer is mounted for movement in a plane through said axes, which machine has a work table movable in said plane by power controlled by said tracer, comprising: a disklike pattern having the cam path defined as radial variations; means for mounting said pattern on said work table for rotation around an axis disposed in said plane parallel to the axes of the cutter and tracer in its normal position; a shaft journaled upon the work table for rotation around an axis disposed at right angles to said axes; a face plate and an arbor fixed upon said shaft for mounting a drum cam blank thereon; means for simultaneously rotating said cam blank and pattern at the same speed to cause the pattern to move the tracer and thereby apply power to move the work table to feed the cutter into the work thereby to cause it to translate the radial variations of the pattern path into axial variations of the path in the cam blank; and brake means on said shaft for preventing creeping of the blank under the influence of said cutter.

References Cited in the file of this patent

UNITED STATES PATENTS

| | | |
|---|---|---|
| 391,619 | Johnson | Oct. 23, 1888 |
| 1,197,896 | Bhisey | Sept. 12, 1916 |
| 1,423,154 | Rosak | July 18, 1922 |
| 1,428,801 | Oulton | Sept. 12, 1922 |
| 1,608,448 | Weber | Nov. 23, 1926 |
| 1,750,885 | Goetz | Mar. 18, 1930 |
| 2,222,069 | Cook | Nov. 19, 1940 |
| 2,435,900 | Perez | Feb. 10, 1948 |
| 2,569,096 | Geiger | Sept. 25, 1951 |

FOREIGN PATENTS

| | | |
|---|---|---|
| 334,254 | Great Britain | Sept. 1, 1930 |
| 700,131 | Germany | Feb. 1, 1941 |